United States Patent
Lin et al.

(10) Patent No.: US 11,385,321 B2
(45) Date of Patent: Jul. 12, 2022

(54) RADAR UNIT, INTEGRATED CIRCUIT AND METHODS FOR DETECTING AND MITIGATING MUTUAL INTERFERENCE

(71) Applicant: NXP B.V., Eindhoven (NL)

(72) Inventors: Yu Lin, Utrecht (NL); Chuang Lu, Eindhoven (NL)

(73) Assignee: NXP B.V., Eindhoven (NL)

( * ) Notice: Subject to any disclaimer, the term of this patent is extended or adjusted under 35 U.S.C. 154(b) by 214 days.

(21) Appl. No.: 16/176,430

(22) Filed: Oct. 31, 2018

(65) Prior Publication Data

US 2019/0195985 A1  Jun. 27, 2019

(30) Foreign Application Priority Data

Dec. 21, 2017 (EP) .................................... 17209561

(51) Int. Cl.
*G01S 13/02* (2006.01)
*G01S 7/02* (2006.01)
(Continued)

(52) U.S. Cl.
CPC ............ *G01S 7/023* (2013.01); *G01S 7/0232* (2021.05); *G01S 7/0233* (2021.05); *G01S 7/36* (2013.01);
(Continued)

(58) Field of Classification Search
CPC ... G01S 7/023; G01S 7/36; G01S 7/40; G01S 7/4021; H01Q 3/36
See application file for complete search history.

(56) References Cited

U.S. PATENT DOCUMENTS 7,187,321 B2  3/2007  Watanabe et al.
7,683,827 B2  3/2010  Kelly, Jr. et al.
(Continued)

FOREIGN PATENT DOCUMENTS

CN  102955151 A  *  3/2013

OTHER PUBLICATIONS

Bechter, J., "Automotive Radar Interference Mitigation by Reconstruction and Cancellation of Interference Component", IEEE MTT-S International Conference on Microwaves for Intelligent Mobility, 2015.
(Continued)

*Primary Examiner* — Timothy A Brainard

(57) ABSTRACT

A radar unit (400) for detecting an existence of interference is described that includes: a millimetre wave (mmW) transceiver (Tx/Rx) circuit configured to radiate a transmit radar signal and receive an echo signal thereof; a mixed analog and baseband circuit operably coupled to the mmW Tx/Rx circuit; and a signal processor circuit (452) operably coupled to the mixed analog and baseband circuit. An interference detection unit (448) is operably coupled to the mmW Tx/Rx circuit and configured to: monitor a whole or a portion of a radar frequency band supported by the radar unit and identify, from a received interference signal, an arrival direction of the identified interference and a level of interference and output an interference detected signal; and wherein the signal processor circuit (452) is configured to analyse the interference detected signal and quantify a response to the detection of an arrival direction and a level of received interference.

20 Claims, 8 Drawing Sheets

(51) Int. Cl.
*G01S 7/40* (2006.01)
*H01Q 3/36* (2006.01)
*G01S 7/36* (2006.01)
*G01S 13/931* (2020.01)

(52) U.S. Cl.
CPC .............. *G01S 7/40* (2013.01); *G01S 7/4021* (2013.01); *G01S 13/931* (2013.01); *H01Q 3/36* (2013.01)

(56) References Cited

U.S. PATENT DOCUMENTS

| | | | |
|---|---|---|---|
| 7,904,117 B2* | 3/2011 | Doan | H04B 7/0615 455/562.1 |
| 9,063,213 B2 | 6/2015 | Himmelstoss et al. | |
| 9,223,009 B1 | 12/2015 | Wasiewicz et al. | |
| 9,223,016 B2* | 12/2015 | Kamimura | G01S 13/18 |
| 10,830,867 B2* | 11/2020 | Lin | G01S 13/86 |
| 2007/0263748 A1 | 11/2007 | Mesecher | |
| 2008/0218406 A1* | 9/2008 | Nakanishi | G01S 13/345 342/192 |
| 2009/0278727 A1 | 11/2009 | Inaba | |
| 2009/0298453 A1* | 12/2009 | Elenes | H04B 7/0857 455/205 |
| 2011/0298651 A1* | 12/2011 | Nakagawa | G01S 7/2927 342/146 |
| 2013/0342381 A1 | 12/2013 | Nakagawa et al. | |
| 2014/0241282 A1* | 8/2014 | Mueller | H04B 7/18506 370/329 |
| 2014/0286360 A1* | 9/2014 | McHenry | H04B 1/71635 370/537 |
| 2015/0237510 A1* | 8/2015 | Kludt | H04W 16/28 370/328 |
| 2015/0378005 A1 | 12/2015 | Kojima | |
| 2016/0238694 A1 | 8/2016 | Kishigami et al. | |
| 2017/0171790 A1* | 6/2017 | Wehinger | H04W 24/10 |
| 2017/0171791 A1* | 6/2017 | Li | H04W 36/06 |
| 2017/0223744 A1* | 8/2017 | Qian | H04W 16/28 |
| 2017/0293016 A1* | 10/2017 | McCloskey | G01S 15/931 |
| 2017/0302329 A1* | 10/2017 | Macmullan | H04B 1/1027 |
| 2018/0254838 A1* | 9/2018 | Garcia Rodriguez | H04B 7/0413 |

OTHER PUBLICATIONS

Brooker, G., "Mutual Interference of Millimeter-Wave Radar Systems", IEEE Transactions on Electromagnetic Compatibility, vol. 49, No. 1, Feb. 2007.

Luo, T., "A 77-GHz CMOS Automotive Radar Transceiver With Anti-Interference Function", IEEE Transactions on Circuits and Systems—I: Regular Papers, vol. 60, No. 12, Dec. 2013.

* cited by examiner

RADAR UNIT, INTEGRATED CIRCUIT AND METHODS FOR DETECTING AND MITIGATING MUTUAL INTERFERENCE

CROSS-REFERENCE TO RELATED APPLICATIONS

This application claims the priority under 35 U.S.C. § 119 of European Patent application no. 17209561.4, filed on 21 Dec. 2017, the contents of which are incorporated by reference herein.

FIELD OF THE INVENTION

The field of the invention relates to a re-configurable architecture for a millimetre wave (mmW) radar unit. The invention is applicable to, but not limited to, a radar unit having an automotive radar sensor configured to detect and mitigate mutual interference and methods therefor.

BACKGROUND OF THE INVENTION

There has been an increased demand for active safety systems for vehicles. Active safety systems require multiple radar sensors per vehicle, each typically working with a specific radar technology. In an automotive application, the radar sensors are mostly built with a few integrated circuits (ICs), or only one IC. The trend is going towards Radar system on chip (SoC, using a radio frequency (RF) CMOS process technology) solution for cost and power consumption consideration. Commercial automotive radar sensors typically include multiple receivers and transmitters, implemented as a phased array radar system, in order to improve the output power, receiver sensitivity and angular resolution. The microcontroller (MCU) performs digital control of the transceiver circuits and digital signal processing of the digitized data (e.g. fast fourier transform (FFT), digital signal/system processing), and outputting of processed data to the central CPU of the vehicle.

Radar sensors transmit signals and radar receivers substantially simultaneously receive their echo. The received echo is than mixed with the transmitted signal and results in a low frequency signal having frequency of $fb=f_{receive}-f_{transmit}$ at the output of the mixer, the so-called beat frequency (fb). By analysing the beat frequency, the range and velocity parameters (i.e. a distance to targets and relative velocity) can be extracted.

Currently, there are a handful of radar sensor technologies adopted and installed by leading vehicle manufacturers. Each of these differs in terms of operational principles and typically each radar sensor architecture (and associated radar technology) is supported by a dedicated integrated circuit (IC) set. Furthermore, with the popularization of driving assistance and self-driving systems, it is envisaged that intra-vehicle and inter-vehicle communications, together with radar signals between vehicles, will increase the levels of encountered interference, In particular, it is envisaged that mutual interference will become a big challenge for automotive radar units, especially in urban areas with dense traffic. The interoperability has been identified as one of the major challenges by automotive manufacturers by J. Dickmann, J. Klappstein, H. L. Bloecher, M. Muntzinger, and H. Meinel, "Automotive radar—quo vadis?," in 2012 9th European Radar Conference, 2012, pp. 18-21.

Due to the spectrum regulation, all of the automotive radar sensors, irrespective of operation types and vendors, are required to work in the frequency range between 76 GHz and 81 GHz, within which 77-81 GHz for short-range radar, and 76-77 GHz for the long-range radar. The radar unit users have freedom on how to utilize this bandwidth. It is known to divide the Radar frequency band into a number of sub-bands according to the operational modes of the Radar sensor. The total number of the sub-bands may be adaptive and depends on the frequency chirp bandwidth of the radar sensor. For example, when the Radar sensor adopts a mid-range radar (MRR) chirp mode, the 77-81 GHz Radar band can be divided into 8 sub-bands of 0.5 GHz. The Radar operational frequency (the FMCW frequency chirp) can be selected as any one of them.

However, interference problems result from several automotive radar units operating in overlapping bands within the same vicinity and with less than perfect antenna radiation pattern. Here, the mutual interference from the other radars may degrade the sensitivity of each other, and even cause false alarms. Sensitivity refers to the ability of the radar to reliably detect objects that produce a weak radar echo signal. The magnitude of the interference depends primarily on the alignment of the radar antennas and the number and types of targets within the mutually illuminated region in space. Whether this interference will be interpreted as a target vehicle or a roadside obstacle will depend on the similarities between the characteristics of the two radars and their relative timing, as detailed in G. M. Brooker, "Mutual Interference of Millimeter-Wave Radar Systems," *IEEE Transactions on Electromagnetic Compatibility*, vol. 49, no. 1, pp. 170-181, February 2007. This paper examines the probability that any mmW radar system will interfere mutually by considering spatial, temporal, and operational frequency-related overlaps. These scenarios are most likely to occur in real driving situations, for example when two radar-equipped cars drive towards each other on a straight road.

Referring now to FIG. 1, a block diagram illustrates a known FMCW radar unit 100. The FMCW radar unit 100 includes one or more transmitters (each consist of an antenna 110, power amplifier (PA) 108, and phase modulator 106) and one or more receivers (each consist of an antenna 111, low noise amplifier (LNA) 112, mixer 114 and analog baseband circuitry 130). The FMCW radar unit 100 further includes one or more signal processing circuits. A frequency chirp generation circuit consists of a buffer or frequency multiplier 104, voltage controlled oscillator (VCO) and waveform modulator 102) and is arranged to generate radio frequency signals.

In a transmitter sense, a digital control and signal processing unit 150 that provides a transmit radar signal to a waveform modulator 102. The waveform generator 102 provides a signal that is to be modulated to a voltage controlled oscillator (VCO) circuit 118. The modulated signal is then optionally passed to a frequency multiplier 104 (if the VCO generated signal is not at the operating frequency of the FMCW radar sensor 100). The high-frequency output 116 of the VCO 118 or the frequency multiplier 104 is passed to a phase modulator 106 and then to a power amplifier 108, where it is amplified and routed to the one or more transmitter antenna(e) 110. A radar signal is received at the one or more receiver antenna(e) 111 and passed to a low noise amplifier (LNA) 112 where it is amplified. The amplified received radar signal is passed to a down-mixer 114, where it is mixed with the high-frequency signal 116 output from the VCO 118. The down-converted received radar signal 120 from down-mixer 114 is input to a programmable baseband circuit 130 that includes a bandpass filter and one or more gain amplifiers, as well as an ADC.

The digital output 134 from the programmable baseband circuit 130 is input to the digital control and signal processing unit 150 for processing and the received processed radar signal 160 is output.

The FMCW radar unit 100 is the most popular operation type in the automotive applications, as it has many advantages over other radar operation type (e.g. higher distance measurement resolution, quick updating, lower peak emitted electromagnetic radiation . . . ).

However, as illustrated in the diagram 200 of FIG. 2, such FMCW radar units are susceptible to interference due to the FMCW radar units 100 continuously transmitting across a wide frequency band. This is due to the larger range of frequencies encountered and due to the lower resultant received signal 'peak' power 205, which is overwhelmed by other emissions. Such undesired received emissions include unwanted direct and/or indirect signals 210 from other automotive radars, or unwanted scattered signal returns coming for example from the road-surface or from various objects at the roadside, each contributing to the overall level of interference. This can lead to a substantial increase in the noise floor across part, or all, of the frequency spectrum, as illustrated in the graph 250, which shows the spectrum of radar received signals with and without strong interference. In this manner, low power targets might not be detected anymore. If parallel frequency ramps of the interferer and the victim occur, this could also lead to the appearance of ghost targets in the receiver structure. The graph 250 illustrates received signal power (in dBm) 260 versus range of the radar 265 and shows the increased level of noise 270 with an interfering FMCW radar unit, as compared to no interference 275.

From a circuit implementation perspective, the absence of interference mitigation in conventional automotive radar sensor receivers and radar units results in designs that require high-dynamic-range and power-hungry receiver RF front ends (RFFEs) and analog-to-digital converters. To mitigate strong interference, the RFFE must have sufficient dynamic range (and consequently high power consumption) in order to prevent strong nonlinearity or saturation of the receiver front-end circuit under interference. Once the radar sensor is jammed by a strong interference, and its receiver circuits are saturated or have to back off the gain in the receiver's analog signal processing chain greatly to accommodate the large unwanted input interference signal on top of the weak wanted echo signal(s), the sensitivity of the Radar sensor is greatly degraded. Alternatively, for weak levels of interference that only cause weak nonlinearities in the analog and RF circuits or slightly increase of the noise floor, it is possible to compensate for these weak levels of interference in the digital domain of the radar unit, e.g. within signal processing unit 150 of FIG. 1, albeit with additional complexity involved.

The mutual interference of automotive radars has been identified as one of the major future challenges by automotive manufacturers. Referring now to FIG. 3, an example flowchart 300 illustrates a conventional FMCW radar operation with interference detection and mitigation by discarding captured data when strong interference signals higher than a pre-set threshold are detected. The flowchart starts at 302 and at system initialization at 304, the radar unit receives commands from a central processor unit with, say, an instruction to operate in a burst or continuous operational mode. The radar unit then configures its internal circuits, e.g. its transceiver circuits, to operate in the instructed mode. At 306, the radar unit enters an 'active' phase, whereby, say, the transmitter and receiver antenna arrays are powered 'on' simultaneously and the radar unit starts to transmit and receive radar (echo) signals. The received radar (echo) signals are down-converted, digitized and processed, and in some examples the digitized received signal data is stored in on-chip memory.

Each cycle for a radar unit to transmit and receive radar (echo) signals can have a total duration of 40-60 msec, which consists of a detection phase (data acquisition) and signal processing phase. In the detection phase, which usually lasts 6-20 msec, the transceiver of the radar sensor transmits and receives one or more slow FMCW chirps (in a continuous chirp mode) or many fast FMCW chirps (in a burst chirp mode) simultaneously. The received analog signal is digitized by the ADC, such as ADC 132 in FIG. 1, and digital data is stored in memory. In the signal processing phase, the captured data is processed in the main controller unit.

At 308, the radar unit transceiver enters an 'idle' mode of operation, whereby the transmitter and receiver antenna arrays are configured in a low power mode, and a majority of the mmWave/analog Tx/Rx circuits are powered off in order to reduce power consumption. Here, the main processing unit of the radar unit processes the received digitized signals to detect whether any interference exists. If, at 310, a determination of a level of interference is such that the interference is greater than a threshold (e.g. the noise floor is higher than a certain level as illustrated in FIG. 2. 270), the captured data is discarded at 312 and the process eventually loops back to 306. However, if the level of interference is such that the interference is not greater than the threshold at 310, the processing unit of the radar unit further processes the received digitized signals at 314 in order to classify targets and thereafter extracts target data such as range, velocity and direction information. If the radar operation has not been stopped at 316, the process loops back to 306. However, if the radar operation has been stopped at 316, the flowchart and process ends at 318.

Thus, current interference mitigation techniques use detection and discard captured data or perform randomization of operation spectral bands. These current solutions are sub-optimal, particularly in light of the increasing use of vehicular radar technology, as well as being unable to mitigate strong levels of interference.

SUMMARY OF THE INVENTION

The present invention provides a radar unit having an automotive radar sensor, integrated circuit and method to detect and a method to mitigate mutual interference, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
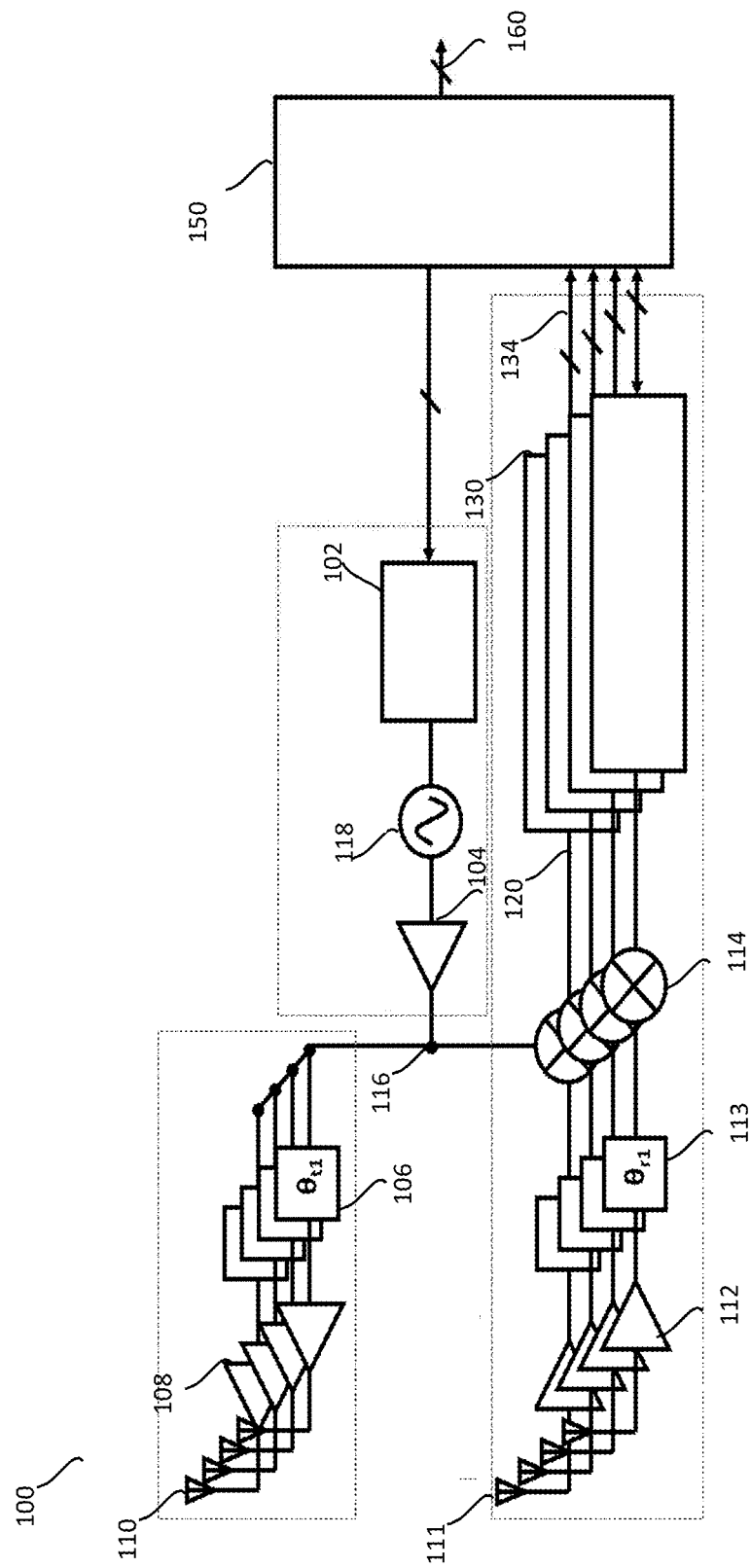
FIG. 1 illustrates a block diagram of a known frequency modulated continuous wave (FMCW) radar unit.
Figure 2:
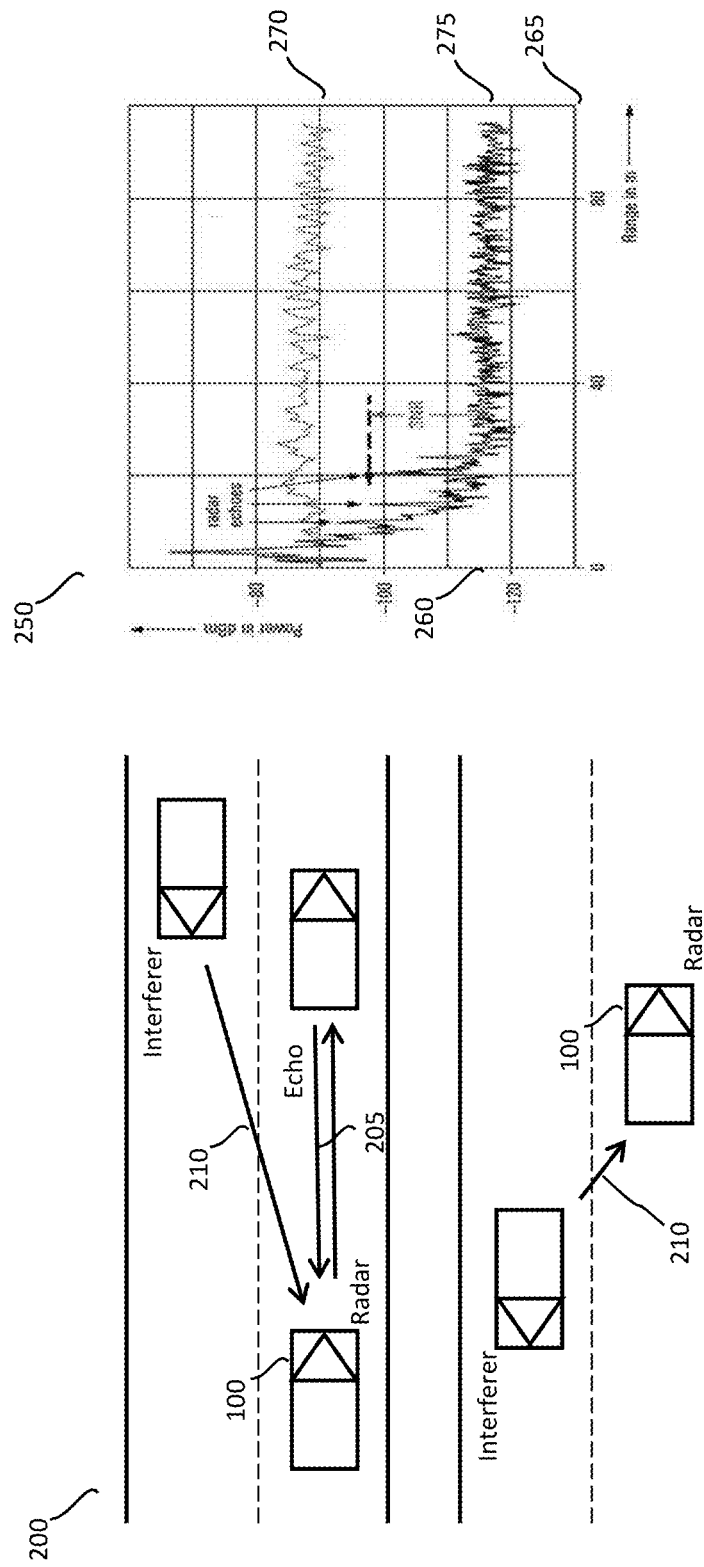
FIG. 2 illustrates an example diagram of a vehicular radar unit illustrating examples of how interference may be created.
Figure 3:
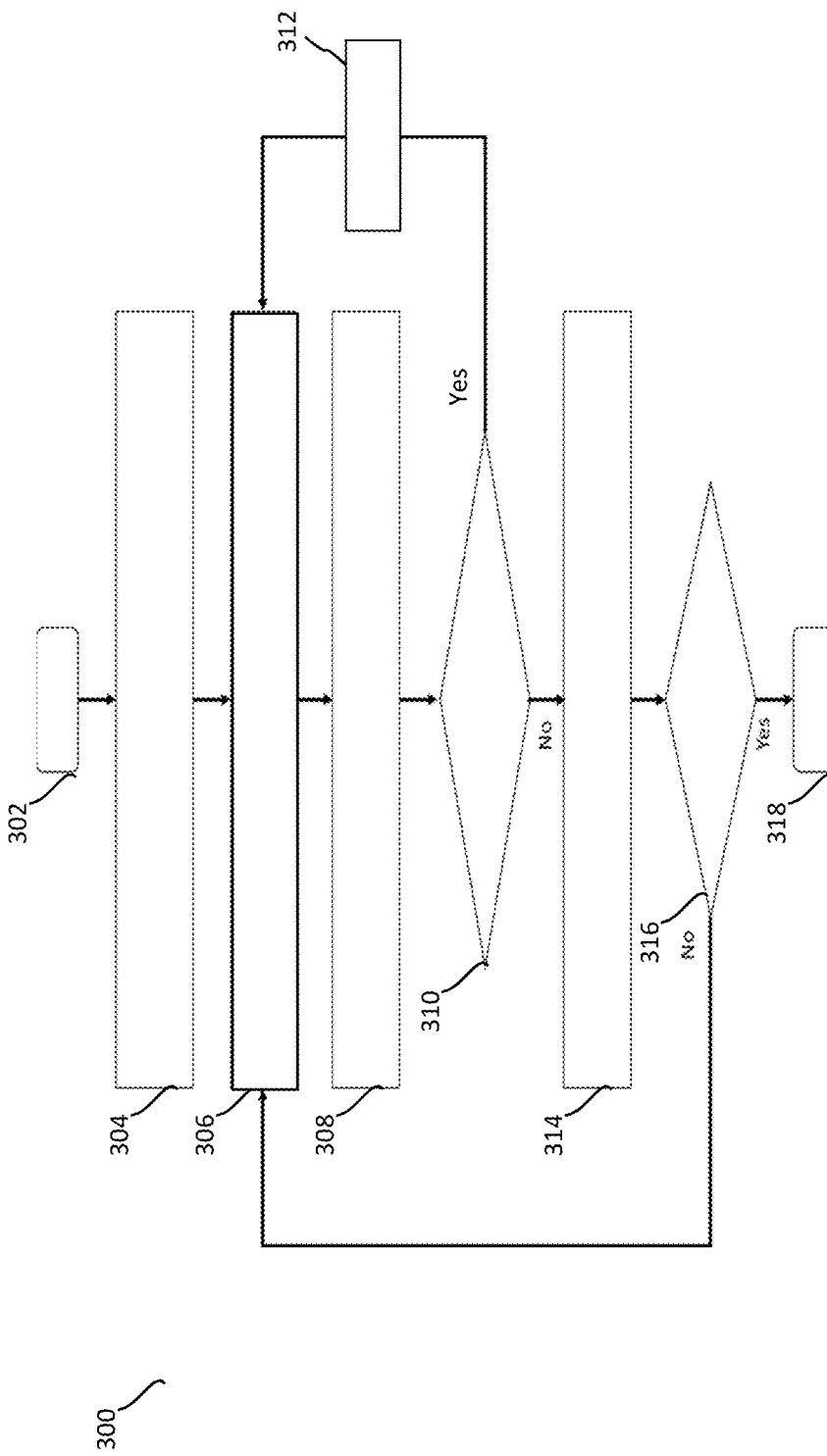
FIG. 3 illustrates an example flowchart of a conventional FMCW radar operation with interference detection and mitigation by discarding captured data when strong interference signals higher than a pre-set threshold are detected.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Examples of the invention propose an architecture and a method of operation to improve automotive radar interoperability and vehicle safety, with a reconfigurable automotive Radar architecture that can be operated between interference detection mode for fast monitoring the Radar frequency band (by configuring part of the transceiver circuits and additional baseband circuits to operate as a wideband receiver) and normal Radar operation modes (target acquisition based on FMCW principle). The architecture and method of operation propose monitoring the radar frequency band (either whole of it or a fraction of it) and thereafter identifying an arrival direction of any determined interference. Thereafter, examples of the invention process this information to adapt the radar transceiver configuration in response thereto, for example changing the operation band of the radar sensor in order to operate in a quiet sub-band. Alternatively and/or additionally, examples of the invention may change a bandwidth employed for the transmit radar signal or timing of the transmitting signal. Examples of the invention propose an automotive radar sensor architecture that can be operated between a wideband interference detection mode, in order to fast scan the radar frequency band and a normal (narrow band) FMCW radar operation mode. Alternatively and/or additionally, examples of the invention may form spatial filtering or nulling toward the direction of strong interference signal, in order to mitigate the determined interference. Alternatively, and/or additionally, examples of the invention may use the interference detection results to assist operation frequency band hopping. Examples of the invention greatly improve the robustness of the radar sensor against mutual interference with other radar sensors that are in the close vicinity, as well as stationary radar jammers.

The inventors of the present invention have recognized and appreciated that it would be advantageous to develop a radar unit design that could detect and mitigate mutual interference in a real-time manner. In some examples, a new architecture is proposed that may avoid interference by means of interference detection and, for example, deterministic frequency hopping or spatial filtering mechanisms to mitigate any detected interference. Consequently, when compared to known techniques and architectures, a hardware efficient implementation and operation is proposed that can detect an existence of interference before normal target acquisition techniques are able to.

Thus, in some examples, a radar unit is configured to monitor a whole or a portion of a radar frequency band and/or an arrival direction of any determined interference. In some examples, a radar unit/radar sensor is described that is configured to detect an existence of interference before normal target acquisition is achieved, by scanning a number of operational bands and identifying a direction of arrival of the interfering signal. The monitored interference information may then be used to configure a radar transceiver.

Such early-obtained interference detection information may then be used to assist a deterministic frequency hopping technique, with hopping between different radar sub-bands. Alternatively, such early-obtained interference detection information may subsequently be used to adjust one or more parameters of a phased array receiver, in order to spatially filter the interference and to improve the target detection sensitivity. In some examples, in response to the interference information and an arrival angle of the interference being identified, this information may also be used to control a transmitter phase array of the radar sensor, to avoid being jammed during normal operation.

In some examples, an auxiliary detection path, for example incorporating an auxiliary receiver, may be used to obtain the interference signal, with a processor connected to this auxiliary receiver configured to obtain the interference information. In some examples, the auxiliary detection path may include a number of wideband multi-receivers for detecting both frequency and direction of interference signals. In a mitigation context, this information may also be used for controlling the receiver array (in case of a phased array Radar) to steer an antenna beam for spatial filtering/nulling of the interference.

In some examples, the techniques herein described focus on mitigating strong levels of interference, for example as strong interference may be more readily detected by the proposed auxiliary detection path. Advantageously, this additional detection path example may benefit from reduced hardware complexity, in terms of, say, sensitivity, as compared with a normal receiver path. This is in contrast to known techniques for mitigating weak levels of interference, which can be addressed by known signal processing techniques if they are found to cause clipping of the main receiving path.

Figure 4:
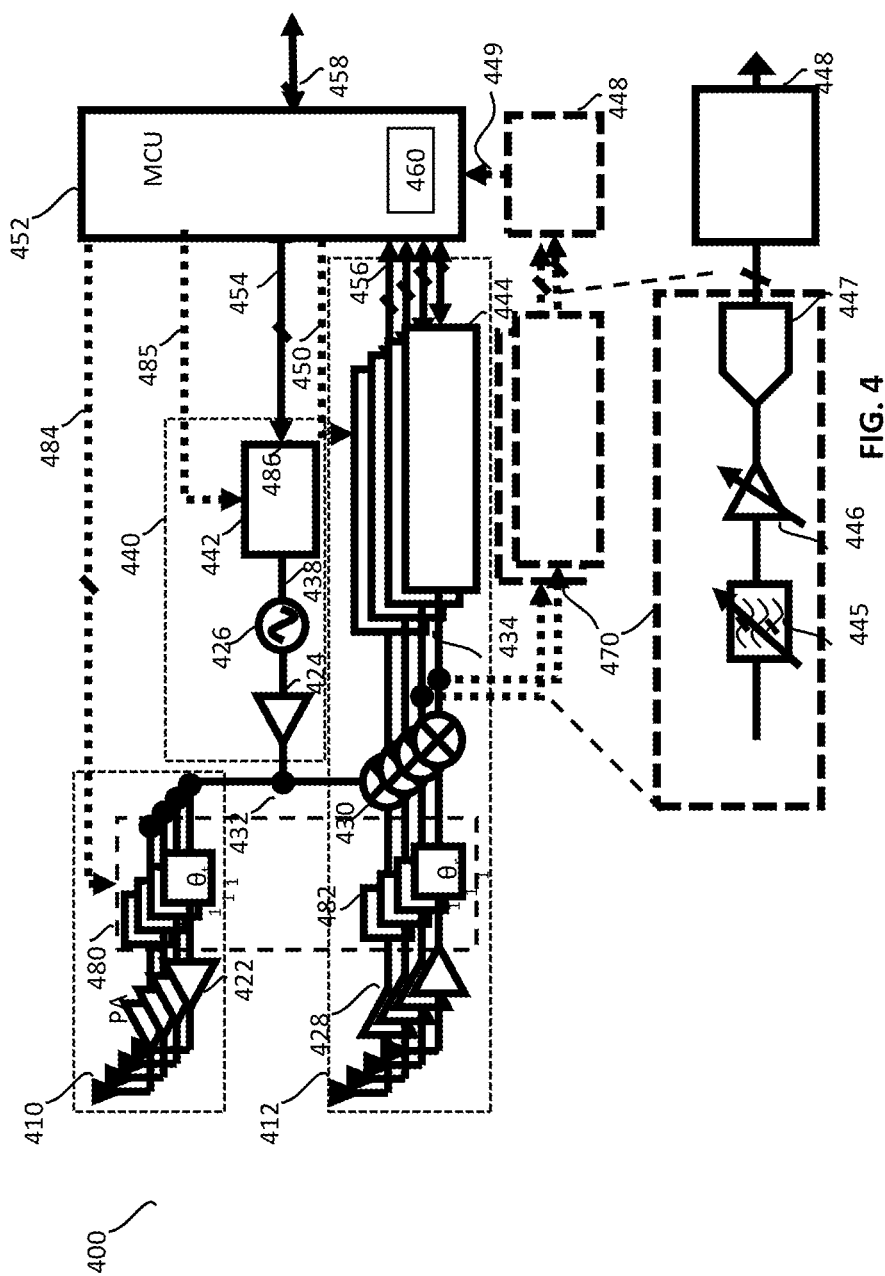
FIG. 4 illustrates a first example block diagram of a radar unit architecture employing a first interference detection mechanism, according to example embodiments of the invention.

Referring first to FIG. 4, a first example block diagram of a radar unit architecture 400 employing a first interference detection mechanism is illustrated, according to example embodiments of the invention. In this example, the radar unit architecture 400 is composed of arrays of transmitters and receivers configured to operate in a frequency modulated continuous wave (FMCW) mode of operation, whereas in other examples (not shown) the radar unit architecture may be composed of a single or a wideband transceiver and/or be configured to operate with other radar modes of operation. Other radar modes of operation may include, for example, pulse mode continuous wave (PMCW), frequency shift keyed (FSK), ultra-wideband (UWB) impulse radar, Pulse Doppler radar, etc. The use of transceiver arrays enables the number of transmitter and receiver channels that can be supported by the radar unit architecture 400 to be scalable.

In a transmitter mode of operation, a microprocessor unit (which may be located in a dedicated processor integrated circuit (IC)) 452 is configured to perform digital control and signal processing that provides a first transmit radar signal 454 to a frequency chirp generator circuit that includes a waveform generator 442 in, say, an analog/mixed signal baseband circuit. The waveform generator 442 provides a signal 438 that is to be modulated by a voltage controlled oscillator circuit 426. The signal to be modulated by the waveform generator 442 may be controlled by a control signal 485, which in this example is provided by digital control and signal processing unit 452. The modulated signal is then optionally passed to a frequency multiplier 424 (if the voltage controlled oscillator (VCO) generated signal is not at the operating frequency of the FMCW radar unit 400). The high-frequency output 432 of the frequency multiplier 424 is routed to transmit phase shifter circuitry 480, which in this example is controlled by a control signal 484, which in this example is provided by digital control and signal processing unit 452. The phase-shifted high-frequency signal is then passed to a power amplifier 422, where it is amplified and routed to the one or more transmitter antennas 410.

In a receiver mode of operation, a first received signal that includes an echo radar signal may be received at the one or more receiver antennas 412 and passed to a low noise amplifier (LNA) 428 where it is amplified. The amplified received signal is passed to a down-mixer 430, where it is mixed with the high-frequency signal 432 output from the VCO 426. The down-converted received radar signal 434 from down-mixer 430 is input to a programmable base band circuit 444, which is controlled by a control signal 450, which in this example is provided by digital control and signal processing unit 452. The programmable base band circuit 444 implements one or more programmable bandpass filter(s) and one or more programmable gain amplifiers (PGAs), as well as a highly linear analog-to-digital converter (ADC) that processes a relative narrow band signal, for example in a range between a few kHz up to 10 to 20 MHz. The programmable base band circuit 444 outputs a narrow-band, high linearity signal 456 to the digital control and signal processing unit 452 for processing and the received processed radar signal 458 is output.

In accordance with examples of the invention, a first interference detection mechanism is implemented by re-configuring one of the receiver paths as a mutual interference detector receiver, which in some examples may include or one or more additional auxiliary baseband detection receiver(s) 470. In examples of the invention, an identification of the interference being caused is the first step to being able to mitigate the effects of the interference. In one example, the one or more additional auxiliary baseband detection receiver(s) 470 may be implemented in the detection path using a wideband receiver configured to cover the complete radar operational bandwidth, and may include one or more of a wideband filter, PGA, and one or more ADCs to facilitate fast scanning of received signals. In this example, a detection path incorporating the one or more additional auxiliary baseband detection receiver(s) 470 does not need to have the same sensitivity as the main radar receiving path (e.g. in FMCW radar spur level below −90 dBFS are required to be detected, within a baseband analog bandwidth of only around 10M to 20 MHz). In order to detect strong interference that is able to saturate the main receiving path (for example by clipping the ADC with a signal that is larger than the maximum input range of the ADC), it is envisaged that a lower receiver dynamic range than that of the main path may be accommodated. Thus, the detection path may be designed to have a medium-to-low resolution/dynamic range, say 40 dB to 50 dB lower than the sensitivity of the main receiving path, but with higher baseband analog bandwidth (e.g. 1 to 2 GHz), for example in order to facilitate fast scanning of a whole radar spectrum.

In this example architecture, signals in the 76-81 GHz band are first passed through the antenna 412 and LNAs 428, then down converted to below 5 GHz in mixers 430 by mixing a fixed LO frequency of 76 GHz (e.g. the high-frequency signal 432 output from the frequency chirp generator 440 can be configured to output a fixed 76 GHz LO signal during a detection phase). Thereafter, the wideband baseband signal will be processed by the one or more programmable bandpass filter(s) 445 and one or more PGAs 446 and ADC 447 (or in programmable base band circuit 444 when one of the paths is converted to support interference detection and is further adapted to include an interference detection unit). Subsequently, the digital outputs are further processed by an interference detection unit 448 to identify the existence of interference. The output 449 from the interference detection unit 448 is then passed to the microprocessor unit to analyse, quantify the level of interference and determine a suitable response thereto.

In some examples, it is envisaged that the prevalent radar performance being monitored includes, for example, an existence of any strong mutual interferences (often termed 'jamming') from other radar units operating in the same vicinity. If vehicles in the vicinity are using a same type of radar, with similar types of transmitting waveforms, it is known that they can cause false alarms (a so-called 'ghost target') or they may degrade the sensitivity of each other. The detection of interference may be performed, for example, through digital signal processing of the spectrum of the received signal, and by observing a noise floor or tones that exceed a theoretical maximum magnitude, etc.

After the interference has been detected and quantified, it is preferable to avoid or suppress the interference as early as possible in the radar signal processing chain (for example in a radio frequency front-end circuit, or a baseband filter in the programmable base band circuit 444, prior to the received signal being digitized by an analog-to-digital converter (ADC)) to avoid clipping the ADC and losing useful target information that cannot be recovered in a digital domain of the signal processing. In some examples, the analysed interference information may be used to control the phase shifters 480/482 via control signal 484 sent from the MCU 452 in order to steer the beam. In some examples, the analysed interference information may be additionally or alternatively used in accordance with a sub-band selection process, by adapting one or more parameters of the frequency chirp generator 440 via control signal 485, for example to assist an operation frequency band switching/hopping technique, with hopping among between different radar sub-bands. Thus, examples of the invention have been configured to enable interference detection as early as possible, and particularly before the target acquisition step in the radar sensor.

In this manner, examples of the invention thereafter allow the radar unit architecture 400 to be able to mitigate the interference by applying circuit techniques in the 'active' mode, such as tuneable spectral bandpass filtering and/or spatial notch filtering, for example by adapting transceiver coefficients applied in the programmable base band circuit 444. The radar unit 400 includes a radar interference detector and architecture reconfiguration control unit 460 that receives an indication of interference that the radar unit is subjected to. In this example, it is envisaged that the radar interference detector and architecture reconfiguration control unit 460 is incorporated into MCU 452. However, in other examples, it is envisaged that the architecture reconfiguration control unit 460 may be operably coupled to the interference detection unit 448 and, say, a digital IC (or domain) and configured to respond to the prevalent radar interference levels provided by interference detection unit 448.

Advantageously, this further improves robustness against interference and avoids/reduces the probability of being jammed. This is in contrast to known techniques that detect the interference during the normal radar target acquisition phase and then discard the detection results.

This interference information may also be used, in one example, to null the interference by using steering phased array transceiver (Tx/Rx) antenna beams configured to form 'nulls' in the antenna beams toward the direction of interference, and thereby improve the target detection sensitivity. In some examples, in response to the interference information and an arrival angle of the interference being identified, this information may also be used to control transmitter phase shifters 480 via control signal 484, to avoid jamming other radar units, where the direction of the interference indicates other radar units, during normal operation.

Figure 5:
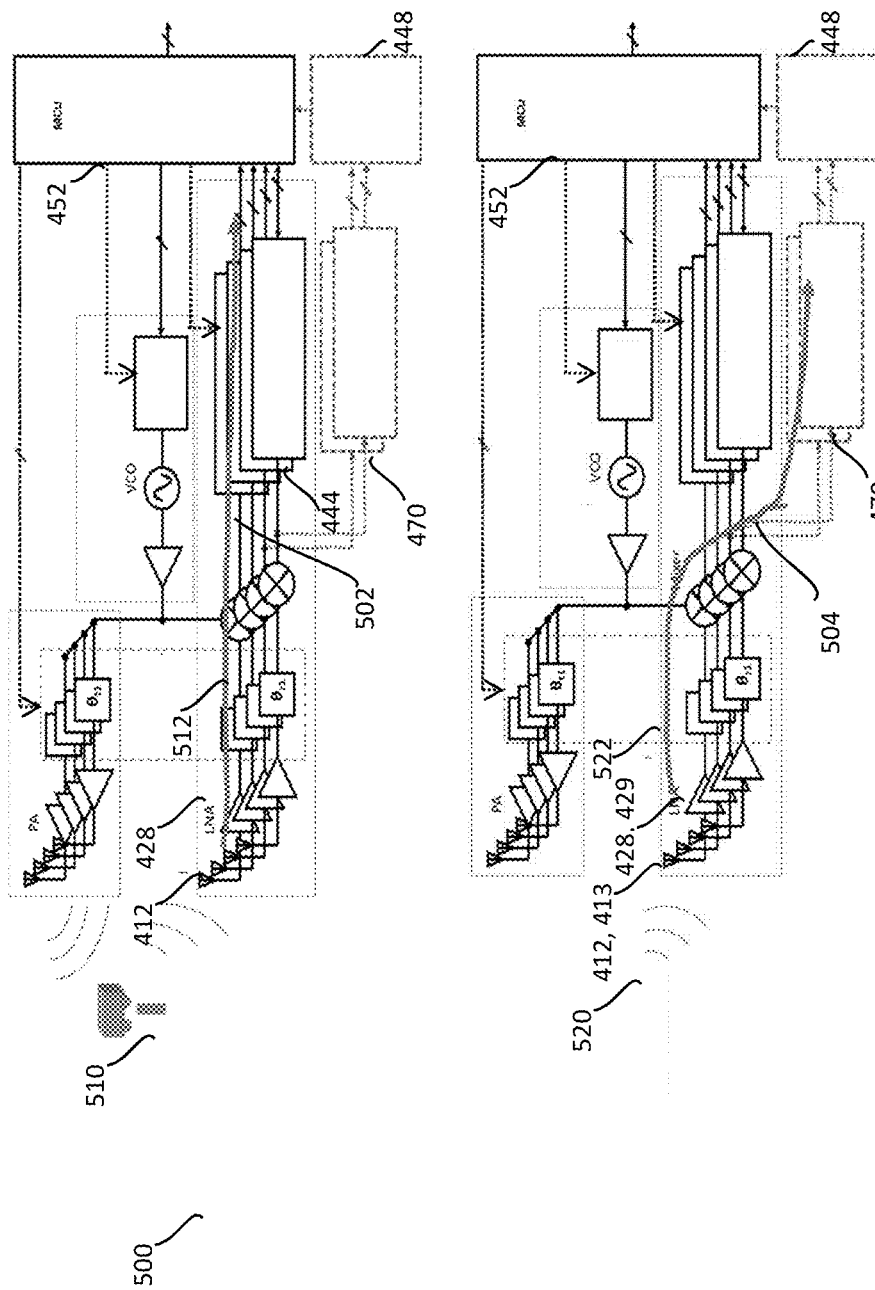
FIG. 5 illustrates an example signal flow diagram of the radar unit architecture of FIG. 4, according to example embodiments of the invention.

Referring now to FIG. 5, an example signal flow diagram of a radar unit architecture 500 is illustrated, according to example embodiments of the invention. FIG. 5 may be viewed as an alternative or improved version of FIG. 4, with more hardware (e.g. LNA/mixer, etc.). shared with main radar receiver. In a normal receiver mode of operation, a first received radar signal 512 may be received at the one or more receiver antennas 412 and passed to a LNA 428 where it is amplified. This received radar signal 512 is an echo from one or more objects 510 from a corresponding transmit signal. The signal is then down-converted and input to programmable base band circuit 444 as described in FIG. 4 and according to a first signal flow path 502. A different (second) signal flow path 504 exists for a second received radar signal 522, received in response to an interferer 520 in a detection phase and/or during an interference detection mode. In an interference detection mode (listen/monitor phase), the transmitter array may be powered off, and, in some examples, the frequency chirp generator may be configured to output fixed frequency signals for scanning different sub-bands. Here, the interference signal may be received at the one or more receiver antennas 412 and passed to a LNA 428, 429 where it is amplified. As this received radar signal 522 is identified as a signal from interference 520, it is then down-converted and input, in this example, to the one or more additional auxiliary baseband detection receiver(s) 470 and interference detection unit 448 for processing, as described in FIG. 4.

Figure 6:
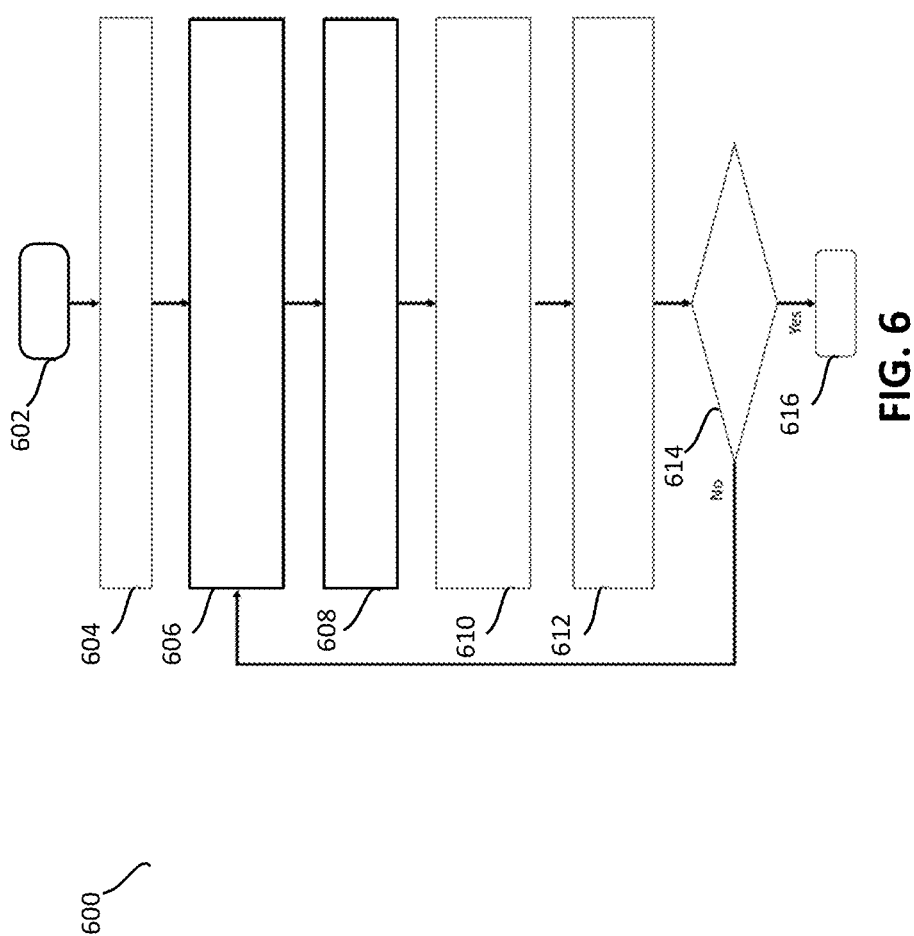
FIG. 6 illustrates an example flowchart of a mutual interference detection and mitigation mode of operation, according to example embodiments of the invention.

Referring now to FIG. 6, an example flowchart 600 of a first operation of a mutual interference detection and mitigation mode of operation is illustrated, according to example embodiments of the invention. In this flowchart, it is assumed that the radar unit is configured to use the one or more additional auxiliary baseband detection receiver(s) 470 and interference detection unit (448), as described with reference to FIG. 4. Furthermore, in this example, it is assumed that the one or more additional auxiliary baseband detection receiver(s) 470 may be operated in an interference detection mode at any time, and not necessarily limited to an initial fast scan mode, as described herein. In this manner, the operation of the example flowchart 600 may be useful in a highly dynamic and traffic congested environment.

The example flowchart 600 starts at 602 and at 604 a system initialization occurs. Here, the radar unit receives commands from the central control unit. At 606, the radar unit (e.g. radar unit 400) enters an interference detection mode, whereby the radar unit powers on, say, only the auxiliary interference detection receiver(s) and circuits associated with the second receiver path 504 of FIG. 5, scans preselected radar sub-bands and directions. In this manner, the auxiliary detection receiver(s) down-converts and digitizes received signals and processes the digital data to extract information of interference, notably of both strength and angle of direction. At 608, the radar unit powers on its transmitter and main receiver array(s), and configures the radar transceiver circuits to operate in a quieter sub-band and/or steer phased array transceivers to form 'nulls' in the antenna beams toward the direction of interference determined from 606.

At 610. the radar unit enters an 'active' phase, for example a target acquisition mode, and powers on the transmitter and receiver arrays simultaneously and starts sending frequency chirp signals (for example one frequency chirp sequence or multiple frequency chirp sequences) and receiving echo signals. In the receive sense, the radar unit down-converts and digitizes received echo signal and stores the data in on-chip memory. At 612, the radar unit enters an 'idle' phase, whereby the radar unit transmitter and receiver are configured in a low power mode. Here, the radar unit MCU processes the received digitized radar signals to classify targets and extract any target(s)' range, velocity, direction information. At 614, the radar unit MCU determines whether the radar operation is stopped. If, at 614, a determination is made that the radar operation is not stopped, the process loops back to 606. If, at 614, a determination is made that the radar operation is stopped, the radar unit is turned off and the flowchart stops at 616.

In this mutual interference detection and mitigation mode of operation, existing hardware may be reused in some examples, such as the receiver mmWave/analog circuits, whereby these circuits are configured to support multiple (e.g. at least two) operational modes by operating in a TDD fashion. For example, a first time period may be allocated for a first scan of interferers in an interference detection and mitigation mode of operation and a second time period may be allocated for a normal target/object acquisition mode of operation. As such, some examples of the invention envisage and utilise a time-discontinuous approach to the two modes of operation, operating in two distinct time periods. A conventional FMCW radar transceiver further operates alternatively between an 'idle' mode (where the transceiver is configured in low power mode with both transmitter and receiver circuits being powered down, and digital signal processing of acquired data being performed) and an 'active' mode (where both transmitter and receiver circuits are powered 'on'). When supporting the mutual interference detection and mitigation mode of operation, an interference detection time period may be inserted into a radar unit's operational timing. Such an interference detection time period may be employed by radar sensors for monitoring, say, a few preselected sub-bands for an existence and/or strength and/or angle of interference of an interfering signal. In this time discontinuous mode of operation, only the receiver circuits need to be turned 'on' with a dedicated digital signal processing unit. Thus, this operational mode differs from the normal 'active' mode. In some examples, this operational mode may use additional hardware or, in other examples, it may re-configure existing hardware to function differently (e.g. operate using a different bandwidth, a different gain . . . , sweeping down mixing frequencies to cover a number of sub bands and/or adjusting receiver active beam directions).

Instead of monitoring the whole radar operation band at any particular point in time, the total frequency band (76 GHz-81 GHz) may be divided to a number of sub-bands (K). Thereafter, in one example, the bandpass filter may be controlled in order to pass receiving signals in only one, or a few, sub-band(s) at a time to the PGA and ADC, such as bandpass filter 445, PGA 446 and ADC 447 in FIG. 4. In this manner, the whole radar frequency band may be scanned in a few cycles in one detection phase, thereby greatly reducing the sampling rate requirement of the ADC to 10 GHz divided by 'K' (e.g. K can be programmably configured to be, say, 10 or even 20) in order to detect an existence of interference across all potentially occupied frequency bands.

Figure 7:
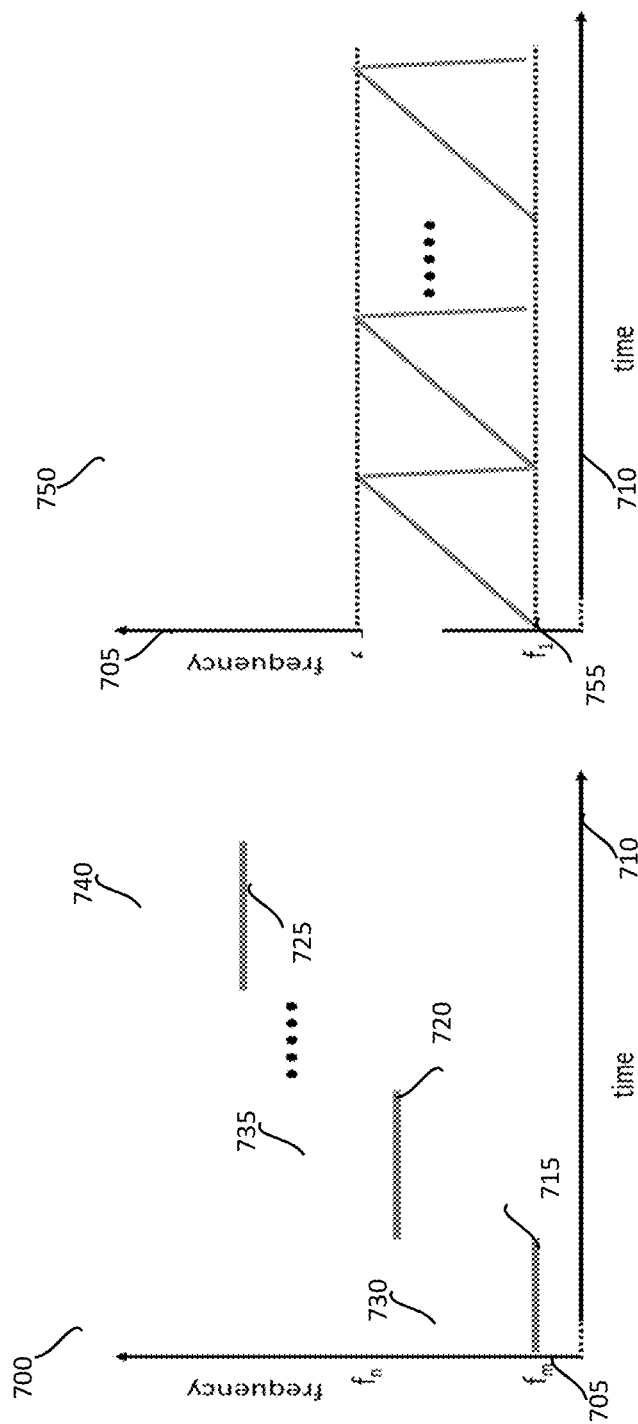
FIG. 7 illustrates two example plots of frequency chirp generator output signal frequency versus time, according to example embodiments of the invention.

Referring now to FIG. 7, two example plots 700, 750 of frequency versus time are illustrated, according to example embodiments of the invention. In FIG. 7, the y-axis 705 is frequency and the x-axis is time 710. The first example plot 700 illustrates an output frequency of the Frequency Chirp Generator in the mutual interference detection mode, e.g. a fast scanning of the Radar band and determination of interference which notably includes a determination of interference arrival direction. The first example plot 700 illustrates scanning an m-th sub-band 715 around a centre frequency during first time period 730, scanning an n-th sub-band 720 around a centre frequency during a second time period 735, and so on to scanning a k-th sub-band 725 around a centre frequency during first time period 740.

The second example plot 750 illustrates the frequency chirp signal in a subsequent normal radar operation mode, whereby the chirp signal transitions (ramps) between a first frequency 755 to a second frequency 760, and where each chirp will linearly ramp from a predefined starting frequency value, e.g. 77 GHz, and end at an another frequency, e.g. 77.6 GHz; the difference of these two values is called the chirp bandwidth (BW); and where each chirp sequence does not necessarily have the same starting and ending frequency values. In accordance with examples of the invention, the selection of the frequency chirp start and end frequencies, f1 755 and f2 760, are made in response to the determination of interference when scanning the sub-bands in the first example plot 700.

In a further optional example, it is envisaged that a hardware and power efficiency may be achieved, where there is no need to scan all the 'K' sub-bands in every interference detection phase. Instead, two or three candidate sub-bands to be monitored may be pre-selected, or dynamically selected, in order to achieve a similar goal, whilst greatly reducing the scanning duration and reducing power consumption. In the mutual interference detection and mitigation phase, it is envisaged that the frequency chirp generator may be configured to generate a set of fixed frequencies, instead of a frequency chirp. These fixed frequencies would correspond to the center frequency of each sub-band to be monitored, as illustrated in FIG. 7.

Figure 8:
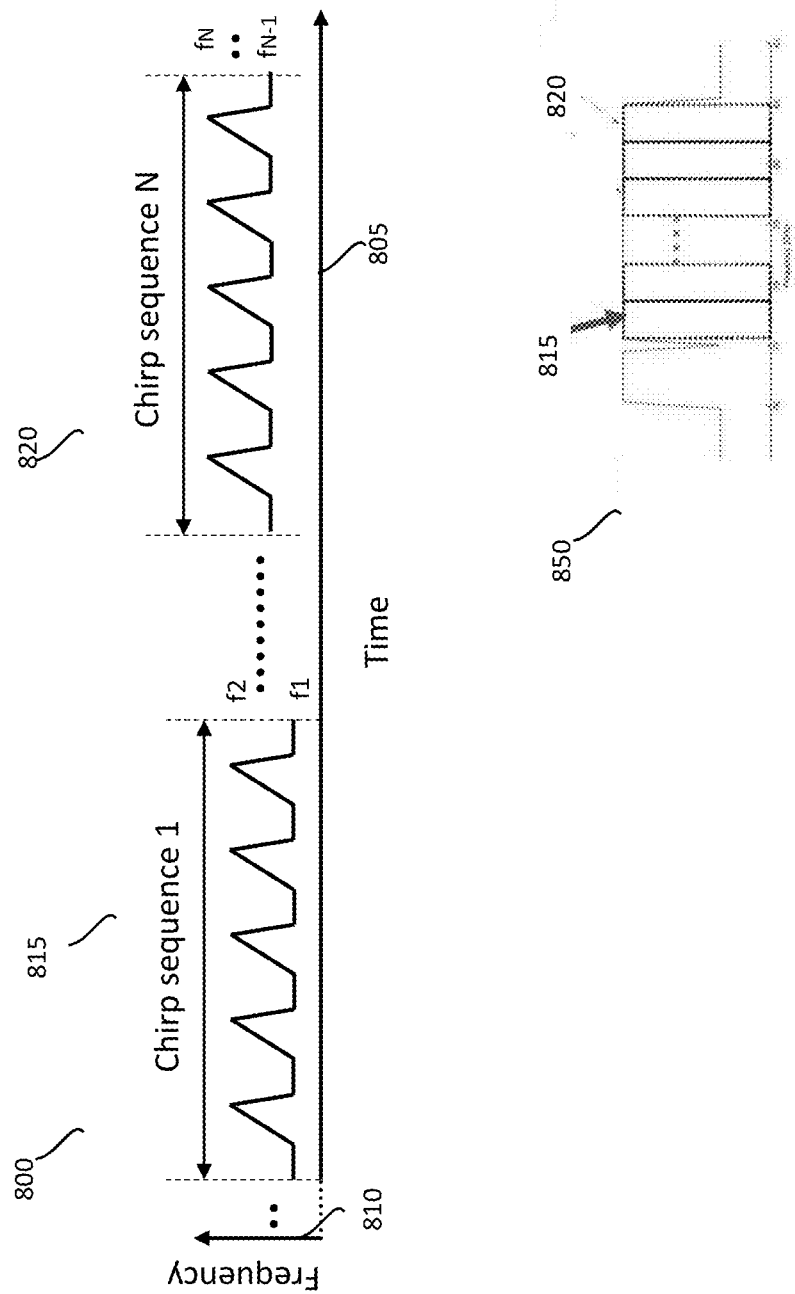
FIG. 8 illustrates a chirp sequence diagram for selecting channel sub-bands, according to example embodiments of the invention.

FIG. 8 illustrates a chirp sequence diagram 800 for selecting and implementing a deterministic frequency hopping between channel sub-bands, according to example embodiments of the invention. The chirp sequence diagram 800 includes time 805 along the x-axis and the chirp start and end frequencies 810 identified along the y-axis. The chirp sequence diagram 800 illustrates an operation of a first chirp sequence 815 between $f_1$ and $f_2$ and a $N^{th}$ chirp sequence between $f_{N-1}$ and $f_N$. A second diagram 850 illustrates a sub-band frequency representation of this operation.

In some examples, when a sub-band that the main radar unit is configured to operate on 815 is identified as being jammed by a strong interference, then it is envisaged that the main radar unit may be configurable to switch/hop to operate in one of the other candidate sub-bands 820 where it is identified that interference is not present, before starting a normal target detection and ranging ('active') mode of operation. The number of candidate sub-bands being monitored and the selection of sub-bands can be determined by the MCU, or in some examples a central computing unit (CPU) of the vehicle which in some examples may be configured to analyse data from other environmental sensors, such as a camera, Lidar, car to car/infrastructure communication (V2X), including other radar units equipped in the same vehicle and so on . . . ) in order to define an optimal low number of candidate sub-bands that have low probability of being jammed. Thus, when the preselected operation band 815 is corrupted by strong interference, the radar sensor operation band in the coming chirp sequence can be changed to a quieter or less corrupted sub-band 820 for improving the detection performance.

In summary, known interference detection techniques in radar units process the captured data in the normal radar operation mode to detect and discard captured data, detect and removal of bad samples or randomize operation spectral bands. The interference detection methods are performed in the normal radar detection phase and in the radar current operational band (the sub-band in which the radar operates at that moment in time). Hence, known interference detection techniques do not provide any ability for the radar unit to determine an existence of interference in other sub-bands. It is noteworthy that the known interference technique to detect and discard captured data loses target information, as the wanted target information cannot be recovered from the corrupted data. This inability to recover corrupted data typically leads to a much higher noise floor and spurious tone levels, or an inability to distinguish the wanted target data from the interference tones. In extreme cases, there is a possibility that the radar sensor may be continuously jammed (on purpose or unintentionally, when the interferer is relatively stationary to the radar sensor). In known radar units, the radar sensor is unable to extricate itself from this jammed state and has to keep on discarding captured data, which can lead to a serious safety issue in automotive applications.

In contrast, examples of the invention enable radar units to avoid discarding wanted target information when interference is encountered. The ability to adapt and reconfigure the radar unit circuits and the radar unit operation in response to detected interferers can lead to power consumption savings. In addition, reconfiguring the main receiver to perform the interference detection in some examples, rather than using one or more dedicated auxiliary receiver(s), may allow faster detection with wider spectrum and spatial coverage.

In summary, examples of the invention focus on a hardware implementation of a radar sensor that can detect interference in both the operational frequency band as well as other radar operational sub-bands, as well as a direction of the interference. Some examples of the invention propose a wide band interference detection receiver (for example located in an auxiliary path to listen the radar spectrum before transmitting signals) instead of reusing the narrow band FMCW receiver (main signal path). In this manner, a fast scanning of the full radar band can be achieved. Additionally, in an interference detection mode to detect an existence of strong interference signals in spectrum bands and an interference direction of arrival, the sensitivity requirement may be more relaxed compared to the normal radar operation mode. Furthermore, some examples of the invention propose to use this interference information to allow a deterministic frequency hopping of the radar unit among different sub-band or operate the phased array receiver to spatially filter and thereby mitigate the interference.

In accordance with example embodiments of the invention, the architecture reconfiguration control unit 460 has been configured to support multiple radar configurations. In some examples, the architecture reconfiguration control unit 460 may be used to implement the reconfigurability of the two modes, namely a wideband interference detection mode (for example by activating the auxiliary signal path and the frequency chirp generator 440 via control signal 485, for example to assist an operation frequency band switching/hopping technique, with hopping among between different radar sub-bands or control the phase shifters 480/482 via control signal 484 sent from the MCU 452 in order to steer the beam) and the normal FMCW operation mode.

Although examples of the invention are described with reference to a radar unit for an automotive safety system, it is envisaged that the concepts herein described may be applicable to other applications, such as radar for robotics or drones.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. The connections as discussed herein may be any type of connection suitable to transfer signals from or to the respective nodes, units or integrated circuit devices. Accordingly, unless implied or stated otherwise, the connections may for example be direct connections or indirect connections. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:
1. A radar unit for detecting an existence of interference, wherein the radar unit comprises:
   a millimetre wave (mmW) transceiver circuit configured to transmit a radar signal and receive an echo signal;
   a mixed analog and baseband circuit operably coupled to the mmW transceiver circuit including a first receiver signal path configured to receive the echo signal;
   a signal processor circuit operably coupled to the mixed analog and baseband circuit; and
   an interference detection unit along a second receiver signal path operably coupled to the mmW transceiver circuit and configured to:
      monitor a wideband of a radio frequency spectrum band; and
      determine an arrival direction of an interference signal and a level of interference based on the monitoring of the wideband of the radio frequency spectrum band,
   wherein the radar unit is configured to operate in a time-discontinuous mode comprising a first duration for performing a mutual interference detection and a second duration for performing normal data acquisition;
   wherein the second receiver signal path includes an auxiliary interference detection path comprising a set of wideband baseband receivers configured to scan each frequency associated with the wideband of the radio frequency spectrum band and detect a frequency and the arrival direction of the interference signal based on the scan of each frequency associated with the wideband of the radio frequency spectrum band;

wherein the auxiliary interference detection path is configured to enable one or more receiver radio frequency circuits during the second duration and enable an auxiliary baseband receiver coupled to the interference detection unit and configured to detect the frequency and the arrival direction of the interference signal during the first duration; and wherein the signal processor circuit is configured to analyze the interference signal and adjust a parameter of the radar unit based on the arrival direction of the interference signal and the level of interference associated with the interference signal.

2. The radar unit of claim 1, wherein the interference detection unit is configured to:
   detect an existence of the level of interference along the second receiver signal path before the radar unit commences a normal radar target acquisition mode of operation along the first receiver signal path.

3. The radar unit of claim 1, further comprising:
   a phase-shift circuit of a phased array transceiver operably coupled to the signal processor circuit and configured to:
      form nulls in one or more antenna beams based on the arrival direction of the interference signal,
      wherein adjusting a parameter of the radar unit comprises forming the nulls in the one or more antenna beams associated with the arrival direction of the interference signal.

4. The radar unit of claim 1, further comprising:
   a phase-shift circuit of a phased array transceiver operably coupled to the signal processor circuit and configured to:
      spatially filter the interference signal using the phased array transceiver based on the level of interference.

5. The radar unit of claim 1, wherein the auxiliary interference detection path is configured to exhibit a resolution and dynamic range.

6. The radar unit of claim 1, wherein the radar unit is configured to:
   activate one or more receiver radio frequency circuits to scan one or more sub-bands of the wideband; and
   activate the interference detection unit to identify the arrival direction of the interference signal and the level of interference during the first duration.

7. The radar unit of claim 1, further comprising:
   a waveform generator coupled to the signal processor circuit and configured to:
      generate a set of frequencies that correspond to a center frequency of each sub-band of the wideband during the first duration.

8. The radar unit of claim 1, further comprising:
   a waveform generator coupled to the signal processor circuit configured to:
      generate a frequency chirp sequence waveform with a start frequency and an end frequency of the chirp sequence based on a non-interfering sub-band on which to operate the radar unit.

9. The radar unit of claim 1, wherein the signal processor circuit is configured to:
   re-configure a receiver path of a set of receiver paths in the mixed analog and baseband circuit and the mmW transceiver circuit as a mutual interference detector receiver.

10. The radar unit of claim 1, wherein the mmW transceiver circuit is configured to operate in a 76-81 GHz communication frequency range.

11. A method for detecting an existence of interference in a radar unit, wherein the method comprises:
    operating in a time-discontinuous mode including a first duration for performing a mutual interference detection and a second duration for performing normal data acquisition monitoring a wideband of a radar frequency spectrum band;
    determining, along a first receiving signal path, an arrival direction of an interference signal and a level of interference based on the monitoring of the wideband of the radio frequency spectrum band; and
    adjusting a parameter of the radar unit based on the arrival direction of the interference signal and the level of interference associated with the interference signal, wherein the radar unit is configured to process an echo signal along a second receiving signal path, the second receiving signal path including an auxiliary interference detection path configured to enable one or more receiver radio frequency circuits during the second duration and detect the frequency and the arrival direction of the interference signal during the first duration.

12. The method of claim 11, wherein adjusting the parameter comprises:
    forming nulls in one or more antenna beams based on the arrival direction of the interference signal;
    spatially filter the interference signal using a phased array transceiver of the radar unit based on the level of interference; and
    generating a frequency chirp sequence waveform with a start frequency and an end frequency of the chirp sequence based on a determined non-interfering sub-band on which to operate the radar unit.

13. The method of claim 11, further comprising:
    detecting an existence of the level of interference before the radar unit commences a normal radar target acquisition mode of operation.

14. The method of claim 11, further comprising:
    scanning each frequency associated with the wideband of the radio frequency spectrum band; and
    detecting a frequency and the arrival direction of the interference signal based on the scan of each frequency associated with the wideband of the radio frequency spectrum band.

15. The method of claim 11, further comprising:
    generating a set of frequencies that correspond to a center frequency of each sub-band of the wideband during the first duration.

16. The method of claim 11, further comprising:
    detecting the level of interference during the first duration.

17. A radar unit for detecting an existence of interference and operating in a time-discontinuous mode including a first duration for performing a mutual interference detection and a second duration for performing normal data acquisition, wherein the radar unit comprises:
    a millimetre wave (mmW) transceiver circuit configured to transmit a radar signal and receive an echo signal;
    a mixed analog and baseband circuit operably coupled to the mmW transceiver circuit including a first receiver signal path configured to receive the echo signal;
    a signal processor circuit operably coupled to the mixed analog and baseband circuit, the signal processor circuit configured to re-configure a receiver path of a set of receiver paths in the mixed analog and baseband circuit and the mmW transceiver circuit as a mutual interference detector receiver; and an interference detection unit along a second receiver signal path including an auxiliary interference detection path configured to enable one or more receiver radio frequency circuits during the second duration and detect the frequency and the arrival direction of the interference signal during the first duration, the second receiver signal path operably coupled to the mmW transceiver circuit and configured to:
- monitor a wideband of a radio frequency spectrum band; and
- determine an arrival direction of an interference signal and a level of interference based on the monitoring of the wideband of the radio frequency spectrum band, wherein the signal processor circuit is configured to analyze the interference signal and adjust a parameter of the radar unit based on the arrival direction of the interference signal and the level of interference associated with the interference signal.

18. The radar unit of claim 17, wherein the interference detection unit is configured to:
detect an existence of the level of interference along the second receiver signal path before the radar unit commences a normal radar target acquisition mode of operation along the first receiver signal path.

19. The radar unit of claim 17, further comprising:
a phase-shift circuit of a phased array transceiver operably coupled to the signal processor circuit and configured to:
- form nulls in one or more antenna beams based on the arrival direction of the interference signal,
- wherein adjusting a parameter of the radar unit comprises forming the nulls in the one or more antenna beams associated with the arrival direction of the interference signal.

20. The radar unit of claim 17, further comprising:
a phase-shift circuit of a phased array transceiver operably coupled to the signal processor circuit and configured to:
- spatially filter the interference signal using the phased array transceiver based on the level of interference.

* * * * *